US009807275B2

(12) United States Patent
Ito

(10) Patent No.: US 9,807,275 B2
(45) Date of Patent: *Oct. 31, 2017

(54) PRINTING DEVICE, MOBILE TERMINAL, AND COMPUTER READABLE RECORDING MEDIUM FOR THE SAME

(71) Applicant: Brother Kogyo Kabushiki Kaisha, Nagoya-shi, Aichi-ken (JP)

(72) Inventor: Chitoshi Ito, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,742

(22) Filed: Sep. 29, 2016

(65) Prior Publication Data

US 2017/0019559 A1    Jan. 19, 2017

Related U.S. Application Data

(63) Continuation of application No. 14/697,377, filed on Apr. 27, 2015, now Pat. No. 9,459,823, which is a
(Continued)

(30) Foreign Application Priority Data

Mar. 14, 2013    (JP) ................. 2013-051929

(51) Int. Cl.
H04N 1/333    (2006.01)
H04N 1/00    (2006.01)
G06F 3/12    (2006.01)

(52) U.S. Cl.
CPC ....... H04N 1/33323 (2013.01); G06F 3/1204 (2013.01); G06F 3/1212 (2013.01);
(Continued)

(58) Field of Classification Search
CPC .......... H04N 1/33323; H04N 1/00307; H04N 1/00106; H04N 2201/0055;
(Continued)

(56) References Cited

U.S. PATENT DOCUMENTS 7,252,633 B2    8/2007 Obata et al.
8,189,225 B1    5/2012 Lo et al.
(Continued)

FOREIGN PATENT DOCUMENTS

CN    1343063 A    4/2002
CN    101253469 A    8/2008
(Continued)

OTHER PUBLICATIONS

Extended EP Search Report dated Apr. 1, 2014, EP Appln. 13199178.8.
(Continued)

Primary Examiner — Allen H Nguyen
(74) Attorney, Agent, or Firm — Banner & Witcoff, Ltd.

(57) ABSTRACT

A printing device includes a printing device side wireless communication unit configured to execute wireless communication with a mobile terminal, an operation acquisition unit configured to acquire user operation thereof, and a processor. The processor is configured to acquire operation data which is generated as the operation acquisition unit acquires a user operation, acquire establishment data which is generated as the printing device side wireless communication unit establishes a wireless communication with the mobile terminal, and issue a request control to control the printing device side wireless communication unit to transmit request data requesting the mobile terminal to transmit print data necessary for printing, via the wireless communication,
(Continued)

when the establishment data is acquired, the request control being issued in accordance with the operation data as acquired.

12 Claims, 10 Drawing Sheets

Related U.S. Application Data continuation of application No. 14/206,571, filed on Mar. 12, 2014, now Pat. No. 9,047,035.

(52) U.S. Cl.
CPC .......... *G06F 3/1222* (2013.01); *G06F 3/1236* (2013.01); *G06F 3/1292* (2013.01); *H04N 1/00106* (2013.01); *H04N 1/00307* (2013.01); *H04N 2201/006* (2013.01); *H04N 2201/0055* (2013.01); *H04N 2201/0094* (2013.01)

(58) Field of Classification Search
CPC ...... H04N 2201/006; H04N 2201/0094; G06F 3/1292; G06F 3/1222; G06F 3/1236; G06F 3/1204; G06F 3/1212
USPC .............................. 358/1.15, 1.14, 1.12, 1.9
See application file for complete search history.

(56) References Cited

U.S. PATENT DOCUMENTS

| | | | |
|---|---|---|---|
| 9,134,932 B2 | 9/2015 | Shiraga | |
| 9,210,732 B2 | 12/2015 | Suzuki | |
| 2001/0034774 A1 | 10/2001 | Watanabe et al. | |
| 2002/0105669 A1 | 8/2002 | Watanabe et al. | |
| 2005/0270556 A1 | 12/2005 | Shimamura | |
| 2007/0011679 A1 | 1/2007 | Abe | |
| 2007/0013963 A1 | 1/2007 | Nakamura | |
| 2007/0229857 A1 | 10/2007 | Aiso | |
| 2009/0036056 A1 | 2/2009 | Oshima et al. | |
| 2009/0103124 A1 | 4/2009 | Kimura et al. | |
| 2009/0207428 A1 | 8/2009 | Tanimoto et al. | |
| 2010/0020355 A1 | 1/2010 | Imai | |
| 2010/0069008 A1 | 3/2010 | Oshima et al. | |
| 2010/0097625 A1 | 4/2010 | Kurihara | |
| 2010/0188695 A1 | 7/2010 | Okigami | |
| 2010/0225962 A1 | 9/2010 | Okigami et al. | |
| 2010/0231958 A1 | 9/2010 | Okigami | |
| 2010/0321730 A1 | 12/2010 | Tomi | |
| 2011/0026068 A1 | 2/2011 | Yoshida | |
| 2011/0043857 A1 | 2/2011 | Hiroki | |
| 2011/0063645 A1* | 3/2011 | Sugino ................. | G06F 3/1204 358/1.13 |
| 2012/0205432 A1 | 8/2012 | Stone et al. | |
| 2012/0246566 A1 | 9/2012 | Shiraga | |
| 2012/0264372 A1 | 10/2012 | Chen et al. | |
| 2013/0044341 A1 | 2/2013 | Uchino | |
| 2013/0141747 A1 | 6/2013 | Oba et al. | |
| 2013/0215446 A1* | 8/2013 | Imai ..................... | H04N 1/4426 358/1.13 |
| 2013/0229690 A1 | 9/2013 | Sumita et al. | |
| 2013/0235422 A1 | 9/2013 | Nakata | |
| 2013/0267277 A1 | 10/2013 | Okigami | |
| 2014/0185097 A1 | 7/2014 | Shiraga | |
| 2014/0253964 A1 | 9/2014 | Asai | |
| 2014/0268231 A1 | 9/2014 | Ito | |
| 2014/0293348 A1 | 10/2014 | Kai | |

FOREIGN PATENT DOCUMENTS

| | | |
|---|---|---|
| CN | 101827363 A | 9/2010 |
| CN | 101834656 A | 9/2010 |
| CN | 102736870 A | 10/2012 |
| CN | 103309633 A | 9/2013 |
| EP | 1199627 A2 | 4/2002 |
| EP | 2026195 A2 | 2/2009 |
| JP | 2004-328275 A | 11/2004 |
| JP | 2006-163791 A | 6/2006 |
| JP | 2007-166538 A | 6/2007 |
| JP | 2007-261042 A | 10/2007 |
| JP | 2009-037566 A | 2/2009 |
| JP | 2009-251823 A | 10/2009 |
| JP | 2010-041580 A | 2/2010 |
| JP | 2010177947 A | 8/2010 |
| JP | 2012-039518 A | 2/2012 |
| JP | 2012-160207 A | 8/2012 |
| JP | 2012-203745 A | 10/2012 |
| JP | 2013-041519 A | 2/2013 |
| JP | 2014-127130 A | 7/2014 |
| WO | 2010107125 A1 | 9/2010 |

OTHER PUBLICATIONS

NFC Forum: "NFC Data Exchange Format (NDEF)—NDEF 1.0", Internet Citation, Jul. 24, 2006 (Jul. 24, 2006), XP002413994, Retrieved from the Internet: URL:http://www.nfc-forum.org/specs/spec_license/download_spec/0f5678c114d295e2da0d902f4e7839846281fc44/NFCForum-TS-NDEF_1.0.pdf [retrieved on Jan. 10, 2007].
Aug. 8, 2014—(U.S.) Non-Final Office Action—U.S. Appl. No. 14/182,661.
Sep. 15, 2014—(U.S.) Non-Final Office Action—U.S. Appl. No. 14/142,046.
Dec. 8, 2014—(U.S.) Notice of Allowance—U.S. Appl. No. 14/182,661.
Jan. 12, 2015—(U.S.) Non-Final Office Action—U.S. Appl. No. 14/228,317.
Jan. 9, 2015—(EP) Extended EP Search Report—App 14152700.2.
Mar. 27, 2015—(U.S.) Final Office Action—U.S. Appl. No. 14/142,046.
Jul. 6, 2015—(U.S.) Final Office Action—U.S. Appl. No. 14/228,317.
Jul. 17, 2015—(U.S.) Non-Final Office Action—U.S. Appl. No. 14/142,046.
Jun. 12, 2015—(CN) Notification of First Office Action—App 201310741160.7, Eng Tran.
Oct. 22, 2015—(U.S.)—Non-Final Office Action—U.S. Appl. No. 14/228,317.
Sep. 29, 2015—(JP) Notification of Reasons for Rejection—App 2013-073552, Eng Tran.
Jan. 29, 2016—(U.S.) Notice of Allowance—U.S. Appl. No. 14/142,046.
Jan. 12, 2016—(JP) Notification of Reasons for Rejection—App 2013-051929, Eng Tran.
Mar. 1, 2016—(U.S.) Notice of Allowance—U.S. Appl. No. 14/228,317.
Feb. 26, 2016—(CN) Notification of the Second Office Action—App 201310741160.7, Eng Tran.
Feb. 23, 2016—(JP) Notification of Reasons for Rejection—App 2012-285178, Eng Tran.
May 26, 2016—(CN) Notification of First Office Action—App 201410123834-1, Eng Tran.
Jun. 8, 2016—(CN) Notification of First Office Action—App 201410083473.2, Eng Tran.
Jul. 19, 2016—(CN) Decision of Rejection—App 201310741160.7, Eng Tran.
Apr. 21, 2017—(CN) Notification of Reexamination—App 201310741160.7, Eng Tran.
May 16, 2017—(JP) Notification of Reasons for Rejection—App 2016-174320, Eng Tran.

* cited by examiner

PRINTING DEVICE, MOBILE TERMINAL, AND COMPUTER READABLE RECORDING MEDIUM FOR THE SAME

CROSS-REFERENCE TO RELATED APPLICATION

This application claims is a continuation of prior U.S. application Ser. No. 14/697,377, filed Apr. 27, 2015, which is a continuation of prior U.S. application Ser. No. 14/206,571, filed Mar. 12, 2014, now U.S. Pat. No. 9,047,035 B2, issued Jun. 2, 2015, which claims priority under 35 U.S.C. §119 from Japanese Patent Application No. 2013-051929 filed on Mar. 14, 2013. The entire subject matter of the application is incorporated herein by reference.

BACKGROUND

Prior Art

The following description relates to a printing device configured to execute a print operation based on print data transmitted from a terminal device to the printing device, the mobile terminal configured to transmit print data to the printing device, and computer readable medium containing instructions to cause above operations.

Recently, a plurality of wireless communication systems have been applied to communication between a mobile terminal device (such as a smartphone and a tablet computer) and a printer having a printing function, the wireless communication systems including Bluetooth (registered trademark), WiFi (registered trademark), and Near Field Communication (NFC). As a wireless communication technique using the wireless communication systems, for instance, a so-called handover communication technique has been proposed in which, initially, wireless communication is established via the NFC between the mobile terminal device and the printer, and then, the communication method is switched via the NFC from the NFC to another communication system capable of higher-speed data communication than the NFC.

Technical Field

Specifically, when data communication is performed between a first communication device and a second communication device, initially, the first communication device acquires a communication system and an encryption system from the second communication device via the NFC. Then, when the acquired communication system and the acquired encryption system are coincident with a predetermined communication system and a predetermined encryption system for the first communication device, respectively, the first communication device is allowed to perform data communication with the second communication device via another communication system capable of higher-speed data communication than the NFC. Such a system may be employed in a communication system including a mobile terminal and a printing device.

SUMMARY

However, the proposed handover communication technique has the following problem. When the proposed handover communication technique is applied to the data communication between a mobile terminal device and a printer, even after wireless communication is established therebetween using the handover communication technique, a further user operation (such as inputting a print instruction) is required for execution of a printing operation after establishment of the wireless communication. Therefore, in this case, the proposed handover communication technique is not so user-friendly.

Aspects of the invention provide a technique improving the operability of the user in such a system.

According to aspects of the present invention, there is provided a printing device, which includes a printing device side wireless communication unit configured to execute wireless communication with a mobile terminal, an operation acquisition unit configured to acquire user operation thereof, and a processor. The processor is configured to acquire operation data which is generated as the operation acquisition unit acquires a user operation, acquire establishment data which is generated as the printing device side wireless communication unit establishes a wireless communication with the mobile terminal, and issue a request control to control the printing device side wireless communication unit to transmit request data requesting the mobile terminal to transmit print data necessary for printing, via the wireless communication, when the establishment data is acquired, the request control being issued in accordance with the operation data as acquired.

According to aspects of the present invention, there is also provided a non-transitory computer readable recording medium storing instructions to be executed by a processor of a printing device, the printing device comprising a printing device side wireless communication unit configured to execute wireless communication with a mobile terminal and an operation acquisition unit configured to acquire user operation thereof. The instructions cause the processor to acquire operation data which is generated as the operation acquisition unit acquires a user operation, acquire establishment data which is generated as the printing device side wireless communication unit establishes a wireless communication with the mobile terminal, and issue a request control to control the printing device side wireless communication unit to transmit request data requesting the mobile terminal to transmit print data necessary for printing, via the wireless communication, when the establishment data is acquired, the request control being issued in accordance with the operation data as acquired.

According to aspects of the present invention, there is also provided a non-transitory computer readable recording medium storing instructions to be executed by a processor of a mobile terminal, the mobile terminal comprising a mobile terminal side wireless communication unit configured to execute wireless communication with a printing device. The instructions cause the processor to acquire establishment data which is generated when the wireless communication is established between the mobile terminal side communication unit and the printing device, acquire request data requesting transmission of print data necessary to execute a printing operation to the printing device via the wireless communication, and output the print data via the wireless communication in accordance with the request contained in the request data when the establishment data and the request data are acquired.

According to aspects of the present invention, there is also provided a mobile terminal, which is provided with a wireless communication unit through which the mobile terminal is communicatable with a printing device, and a processor. The processor is configured to acquire establishment data which is generated when the wireless communication is established between the mobile terminal side communication unit and the printing device, acquire request data requesting transmission of print data necessary to execute a printing operation to the printing device via the wireless communication, and output the print data via the wireless communication in accordance with the request contained in the request data when the establishment data and the request data are acquired.

BRIEF DESCRIPTION OF THE ACCOMPANYING DRAWINGS

DESCRIPTION OF THE EMBODIMENTS

It is noted that various connections are set forth between elements in the following description. It is noted that these connections in general and, unless specified otherwise, may be direct or indirect and that this specification is not intended to be limiting in this respect. Aspects of the invention may be implemented on circuits (such as application specific integrated circuits) or in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompanying drawings.

First Embodiment

Figure 1:
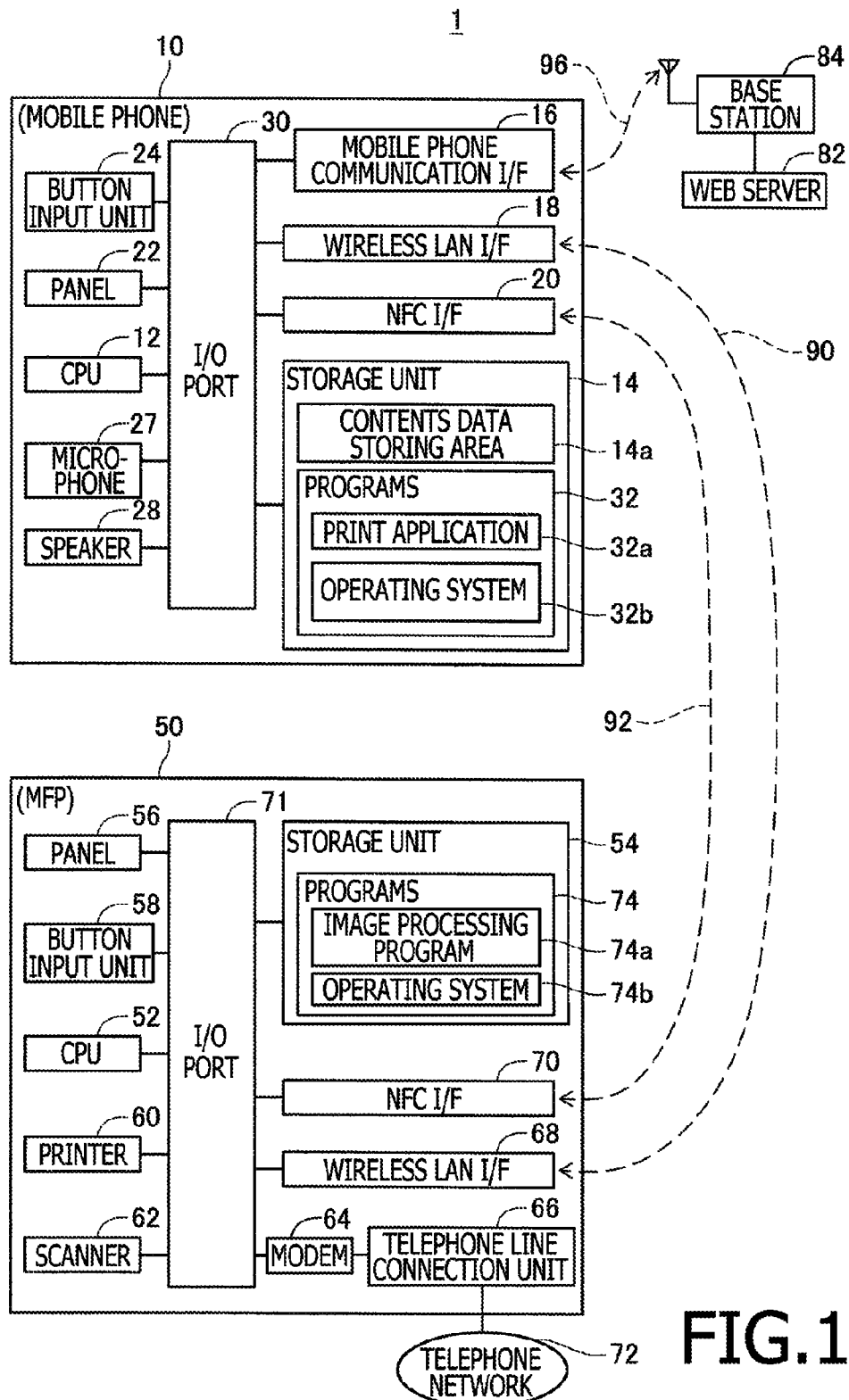
FIG. 1 is a block diagram showing electrical configuration of a communication system according to a first embodiment of the invention.

As shown in FIG. 1, a communication system 1 of the embodiment includes a mobile phone 10, a multi-function peripheral (MFP) 50, a web server 82, and a base station 84. Each of the mobile phone 10 and the MFP 50 is configured to serve as a wireless LAN terminal device. Further, the MFP 50 is configured to have a plurality of functions such as a printing function, a scanning function, a copying function, and a facsimile function. The web server 82 is configured to provide a client device, via a network, with a function and data owned by the web server 82.

A configuration of the mobile phone 10 will be described. The mobile phone 10 includes a central processing unit (CPU) 12, a storage unit 14, a mobile phone communication interface (I/F) 16, a wireless LAN interface (I/F) 18, an NFC interface (I/F) 20, a panel 22, a button input unit 24, a microphone 27, and a speaker 28. These elements 12, 14, 16, 18, 20, 22, 24, 27, and 28 are configured to communicate with each other via an input-output port 30.

The wireless LAN I/F 18 is configured to perform WiFi Direct (WFD) (registered trademark) wireless communication 92 based on the communication standard IEEE 802.11 or an equivalent standard. Namely, the mobile phone 10 is configured to perform direct data communication with the MFP 50 when accessing an access point of the MFP 50 so as to be allowed to perform the WFD wireless communication 92.

The NFC I/F 20 is configured to perform NFC wireless communication 92 based on international standards of ISO/IEC21481 or ISO/IEC18092. Namely, the mobile phone 10 is configured to perform direct data communication with the MFP 50 when put into a state of the NFC wireless communication 92 being available. In this respect, nonetheless, the NFC wireless communication 92 has a shorter communicable distance and a lower communication speed than the WFD wireless communication 90.

The mobile phone communication I/F 16 is configured to perform mobile phone wireless communication 96 with the base station 84. Namely, the mobile phone 10 is configured to perform data communication via the web server 82 and the base station 84 when put into a state of the mobile phone wireless communication 96 being available.

The CPU 12 is configured to carry out processes in accordance with programs 32 stored in the storage unit 14. Hereinafter, the CPU 12 executing the programs (such as a print application 32a) may be simply referred to as a program name. For instance, "the print application 32a" may represent "the CPU 12 that executes the print application 32a." It is noted that the storage unit 14 may include a combination of a random access memory (RAM), a read only memory (ROM), a flash memory, a hard disk drive (HDD), and a buffer of the CPU 12.

The storage unit 14 is configured to store the programs 32, which contain the print application 32a and an operating system (OS) 32b. The print application 32a is configured to cause the CPU 12 to carry out a process for controlling the MFP 50 to print images expressed by contents data stored in a contents data storage area 14a.

The OS 32b is a program configured to provide a basic function to be used by the print application 32a. The OS 32b contains programs for performing the wireless communications 90, 92, and 96 via the wireless LAN I/F 18, the NFC I/F 20, and the mobile phone communication I/F 16, and programs for controlling the storage unit 14, the panel 22, and the button input unit 24.

Further, the storage unit 14 includes the contents data storage area 14a, which is configured to store a plurality of pieces of photograph data (e.g., JPEG data) and document data (e.g., PDF data). In addition, the document data generally contains a plurality of pieces of page document data corresponding to a plurality of pages. The photograph data is an example of the image data. The page document data is also an example of the image data. The print application 32a is configured to acquire data from the storage unit 14 via the OS 32b.

The panel 22 includes a display screen configured to display various functions of the mobile phone 10. The print application 32a is configured to output and display image data on the panel 22 via the OS 32b. The button input unit 24 includes a touch sensor, and is integrated with the panel 22. Thus, the button input unit 24 is configured to detect an input medium close to or in contact with the panel 22, and accept a user's button operation. The print application 32a is configured to acquire, via the OS 32b, data indicating what button operation has been performed by the user.

A configuration of the MFP 50 will be described. The MFP 50 includes a CPU 52, a storage unit 54, a panel 56, a button input unit 58, a printer 60, a scanner 62, a MODEM (modulator-demodulator) 64, a telephone network connection unit 66, a wireless LAN I/F 68, and an NFC I/F 70. These elements are configured to communicate with each other via an input-output port 71.

The wireless LAN I/F 68 is configured to perform WiFi Direct (WFD)(registered trademark) wireless communication 92 based on the communication standard IEEE 802.11 or an equivalent standard. The NFC I/F 70 is configured to perform NFC wireless communication 92 based on international standards of ISO/IEC21481 or ISO/IEC18092.

The CPU 52 is configured to carry out processes in accordance with programs 74 stored in the storage unit 54. Hereinafter, the CPU 52 executing the programs (such as a print process program 72a) may be simply referred to as a program name for brevity. For instance, "the print process program 72a" may represent "the CPU 52 that executes the print process program 72a."

The storage unit 54 is configured to store programs 74, which include the print process program 74a and an operating system 74b (occasionally referred to simply as OS). The print process program 74a is a program that causes the CPU 52 to execute a process in which the printer 60 prints out an image represented by the contents data stored in the contents data storing unit 14a of the mobile phone 10.

The OS 74b is a program providing basic functions utilized by the print process program 74a. The OS 74b includes programs for executing the wireless communications 90 and 92 via the wireless LAN I/F 68 and the NFC I/F 70, and programs for controlling the storage unit 54, the panel 56 and the button input unit 58. The storage unit 54 may be a computer-accessible storage medium similar to the storage unit 14.

The panel 56 has a displaying surface which displays the functions of the MFP 50. The print process program 74a outputs image data for display, displays the image based on the image data for display via the OS 74b. The button input unit 58 includes a touch sensor which is integrally provided to the panel 56. The touch sensor detects approach/touch of an input device (e.g., a user's finger) with respect to the panel 56 and acquires a user operation of the buttons of the button input unit 58. The print process program 74a acquires data indicative of user operation of the button input unit 58 via the OS 74b.

The printer 60 executes a printing operation, and the scanner 62 executes a scanning operation. The MODEM 64 functions to modulate data of original to be sent by facsimile to a signal that can be transmitted through the telephone network 72 and transmit the same via the telephone circuit connecting unit 66 and/or receives a signal, via the telephone circuit connecting unit 66, from the telephone network 72 and demodulate the received signal to reproduce data of original.

<Print Process by MFP>

According to the communication system 1, simply by locating the mobile phone 1 at a position close to the MFP 50, it is possible to cause the MFP 50 to print a desired image among the images corresponding to the contents data stored in the contents data storage area 14a.

Figure 3:
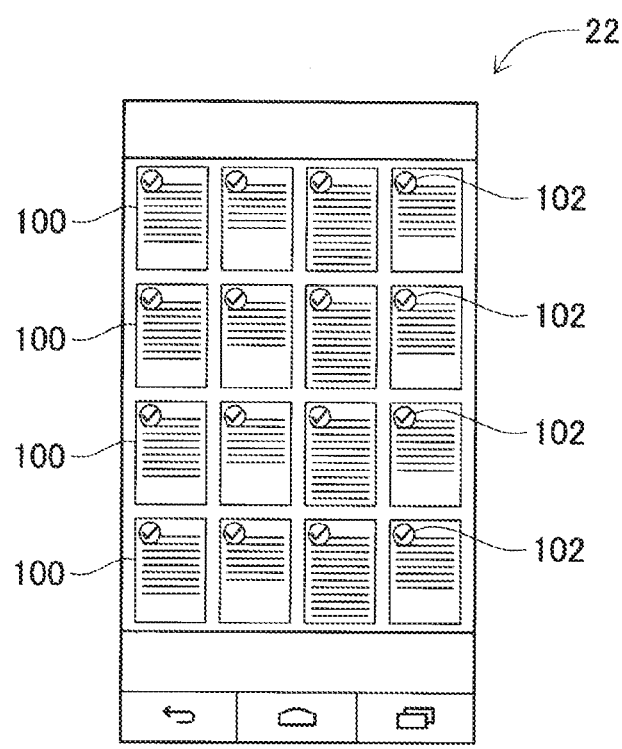
FIG. 3 shows an example showing a state where an image is displayed on a panel of a mobile phone according to the first embodiment of the invention.

Specifically, in the mobile phone 10, images 100 based on the contents data stored in the contents data storage area 14a are displayed on the panel 22 of the mobile phone 10 in thumbnail form as shown in FIG. 3. In the contents data storage area 14a, a plurality of pieces of photograph data (e.g., JPEG data) and document data (e.g., PDF data). The mobile phone 10 is configured to display photograph images on the panel 22 based on the JPEG data.

It is noted that the mobile phone 10 is unable to display an image of a document on the panel 22 based on the PDF data. Therefore, according to the embodiment, the mobile phone 10 forward the PDF data to the web server 82 via the wireless communication 96. At web server 82, each page of the document data (PDF data) is converted into JPEG page data. That is, the PDF form document data is converted into a plurality of pages of JPEG data. The converted JPEG data is transmitted, via the wireless communication 96, to the mobile phone 10. Then, the mobile phone 10 displays the document image on the panel 22 based on the JPEG form document data.

On an upper portion of each of the plurality of images 100, a check area (circle) 102 is provided. The check area 102 is for indicating whether the image 100 on which the check area 102 is provided is selected by the user or not. The check area 102 is checked when the user taps the image 100. That is, the image 100 of which the check area 102 is checked is the image 100 selected by the user. Further, when the user taps the image 100 of which check area 102 is checked, the check is released (a check mark in the check area 102 disappears), and the image 100 is deselected. With this configuration, the user can select/deselect desired images 100 displayed on the panel 22. It is noted that the "tapping" operation is to move an inputting member (e.g., a finger) to closer to the panel 22 or touch the panel 22.

Figure 2:
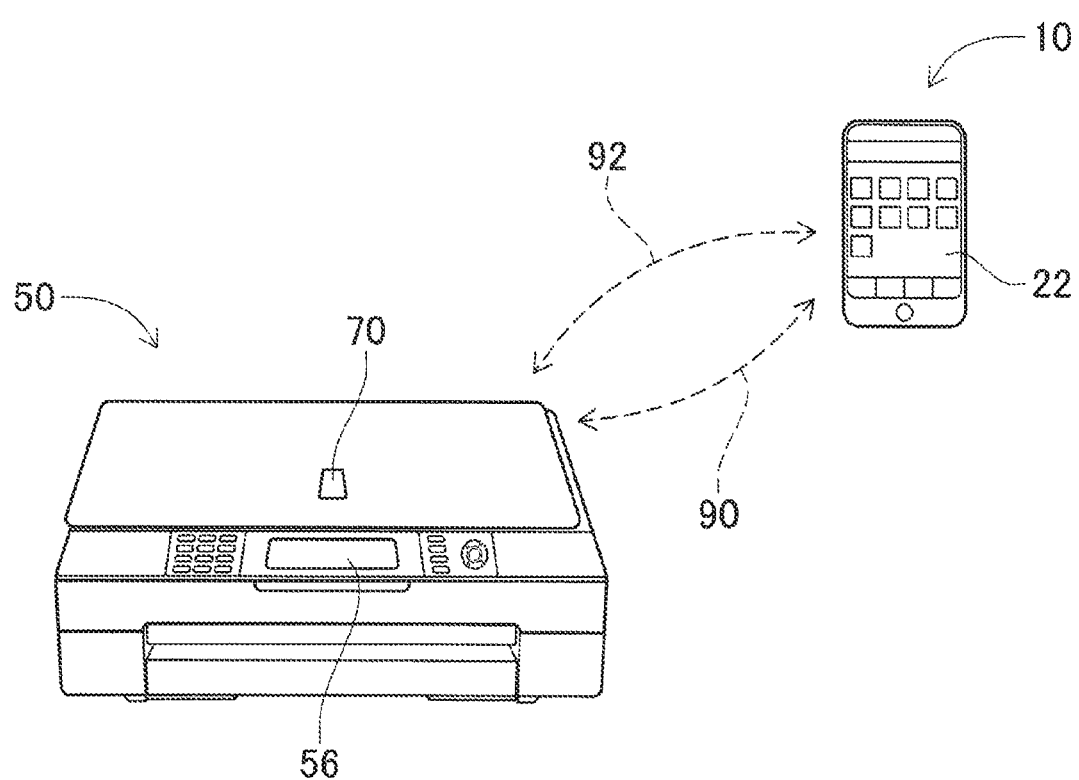
FIG. 2 is a perspective view showing the communication system according to the first embodiment of the invention.

After the user selects desired ones of the images 100 displayed on the panel 22, and wishes to print the selected images 100 with the MFP 50, the user make the mobile phone 10 closely approach the MFP 50. It is noted that the NFC printing is a printing operation making use of the NFC wireless communication. Therefore, the mobile phone 10 is located at a position close to the NFC I/F 70 of the MFP 50. According to the first embodiment, the NFC I/F 70 is provided on the upper surface of the MFP 50 as shown in FIG. 2.

Figure 4:
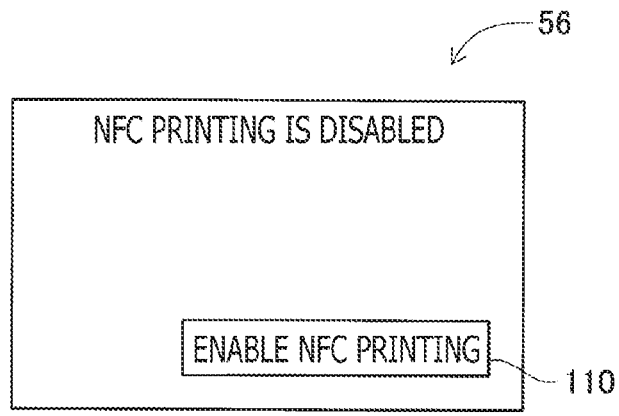
FIG. 4 shows an example showing a state where an image is displayed on a panel of a MFP (multi-function peripheral) according to the first embodiment of the invention.

When the mobile phone 10 is located close to the MFP 50 and a distance between the mobile phone 10 and the MFP 50 is small enough (i.e., within a communicatable range of the NFC wireless communication 92), an initial sequence of the NFC wireless communication 92 is performed between the mobile phone 10 and the MFP 50, and the NFC wireless communication 92 is established therebetween. When the NFC wireless communication 92 has been established, the NFC print operation making use of the wireless communication 92 is executed. According to the embodiment, the MFP 50 is configured such that a state where the NFC wireless communication 92 is enabled, and a state where the NFC wireless communication 92 is disabled are switched. Specifically, when the NFC wireless communication 92 is disabled, even if the mobile phone 10 is located close to the MFP 50, the NFC wireless communication 92 is not established. That is, the NFC print operation cannot be executed. In this state, as shown in FIG. 4, a screen indicating the NFC printing is disabled (hereinafter, such a screen will be referred to as an NFC print disabled screen) is displayed on the panel 56 of the MFP 50. When the NFC print disabled screen is displayed on the panel 56, even if the mobile phone 10 is located at a position close to the MFP 50, the NFC printing is not executed.

Figure 5:
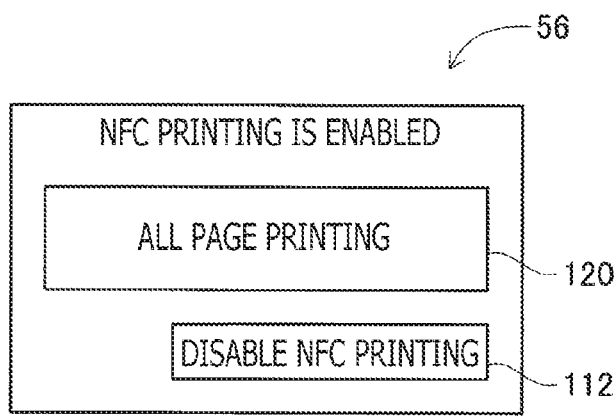
FIG. 5 shows an example when an image is displayed on the panel of the MFP according to the first embodiment of the invention.

On the panel 56 displaying the NFC print disabled screen, an NFC print enabling button 110 is displayed. The NFC print enabling button 110 is a button for enabling the NFC wireless communication 92. When the NFC print enabling button 110 is operated, a screen indicating that the NFC print is enabled (hereinafter, such a screen will be referred to as a NFC print enabled screen) is displayed on the panel 56 as shown in FIG. 5. When the mobile phone 10 is located close to the MFP 50 while the NFC print enabled screen is being displayed on the panel 56, the NFC wireless communication 92 is established. Therefore, the NFC print can be executed.

On the panel displaying the NFC print enabled screen, an NFC print disabling button 112 is also displayed. The NFC print disabling button 112 is a button for disabling the NFC wireless communication 92. When the NFC print disabling button 112 is operated, the NFC print disabled screen (FIG. 4) is displayed on the panel 56 and the MFP 50 is in a state where the NFC print cannot be executed.

In the communication system 1, printing of the images 100 selected on the mobile phone 10 and printing of all the images 100 included in the contents data which includes the images 100 can be made by the operation of the MFP 50. That is, the user can select whether all the images 100 included in the contents data subject to print are to be printed, or desired images included in the contents data are to be printed, by operating the MFP 50.

Specifically, on the panel 56 displaying the NFC print enabled screen (see FIG. 5), all page print button 120 is displayed. The all page print button 120 is for designate an all image printing operation. When the all page print button 120 is operated, all the images included in the contents data subject to print are printed. Incidentally, the all page print button 120 is a capacitance type touch button, and when the inputting member (e.g., a finger) is closely located to or touches the all page print button 120, the CPU 52 judges that the button 120 is operated.

When the user selects desired images 100 from among the images 100 displayed on the panel 22, and intends to execute the selected image printing, but not all image printing, the user should locate the mobile phone 10 at a position close to the MFP 50 to establish the NFC wireless communication, without operating the all page print button 120.

When the NFC wireless communication 92 is established, connection information for establishing the WFD wireless communication 90 is exchanged between the mobile phone 10 and the MFP 50 using the established NFC wireless communication 92.

The reason why the WFD wireless communication 90 is established is as follows. Generally, it is preferable to transmit/receive the document data and/or photograph data in accordance with the WFD wireless communication 90 since the WFD wireless communication 90 can execute a high-speed data transmission/reception in comparison with the NFC wireless communication 92. It is also noted that the WFD wireless communication 90 can handle transmission/reception of data for a relatively long distance in comparison with the NFC wireless communication. Therefore, also in this regard, it is preferable to use the WFD wireless communication 90 for transmitting/receiving the document data and photograph data.

Together with the SSID, instruction data instructing transmission of image data of the images 100 which are selected on the mobile phone 10 is transmitted, via the NFC wireless communication 90, from the MFP 50 to the mobile phone 10. In response to receipt of the instructions, the mobile phone 10 transmits the image data of the images 100 selected on the mobile phone 10 to the MFP 50 via the NFC wireless communication 90. The MPF 50 executes a print process of the images based on the received image data. That is, the MFP 50 executes the print process to print images corresponding to the images 100 selected on the mobile phone 10.

As above, the user of the mobile phone 10 can make the MFP 50 print the images 100 simply by selecting the images 100 from among the ones displayed on the panel 22 and make the mobile phone 10 approach the MFP 50. That is, user operations to input a printing instruction on the mobile phone 10, which improves the operability of the mobile phone 10.

When the user intends to execute the all image printing and does not intend to print only desired images included in the contents data, the user is required to bring the mobile phone 10 close to the MFP 50 with operating the all page print button 120. The user may operate the all page print button 120 with one hand, while bring the mobile phone 10 close to the MFP 50 with the other hand. With this handling, the NFC wireless communication 92 is established and the SSID of the mobile phone 10 is transmitted from the mobile phone 10 to the MFP 50 via the wireless communication 92.

If the SSID of the mobile phone 10 is compatible to the MFP 50, instruction data instructing to transmit all the image data included in the contents data subject to print is transmitted from the MFP 50 to the mobile phone 10 together with the SSID of the MFP 50 via the NFC wireless communication 92. In response to the instruction data, the mobile phone 10 transmits all the image data included in the contents data subject to print to the MFP 50 via the WFD wireless communication 90. Then, the MFD 50 execute the print process based on the received image data. That is, the MFD 50 executes the print process to print the images 100 based on the all the image data included in the contents data subject to print.

As above, as the user operates the all page print button 120 with one hand, while bring the mobile phone 10 close to the MFP 50, all the images 100 included in the contents data subject to print can be printed with the MFP 50. That is, the user is only required to a series of operations to operate the all page print button 120 with one hand and to bring the mobile phone 10 close to the MFP 50, printing of all the pages can be executed. Since the user is not required elaboration to select desired images on the mobile phone 10, the operability is improved.

<Print Application and Print Process Program>

The above-described print process is executed as the print application 32a is executed by the CPU 12 of the mobile phone 10 and the print process program 74a is executed by the PCU 52 of the MFP 50.

Figure 6:
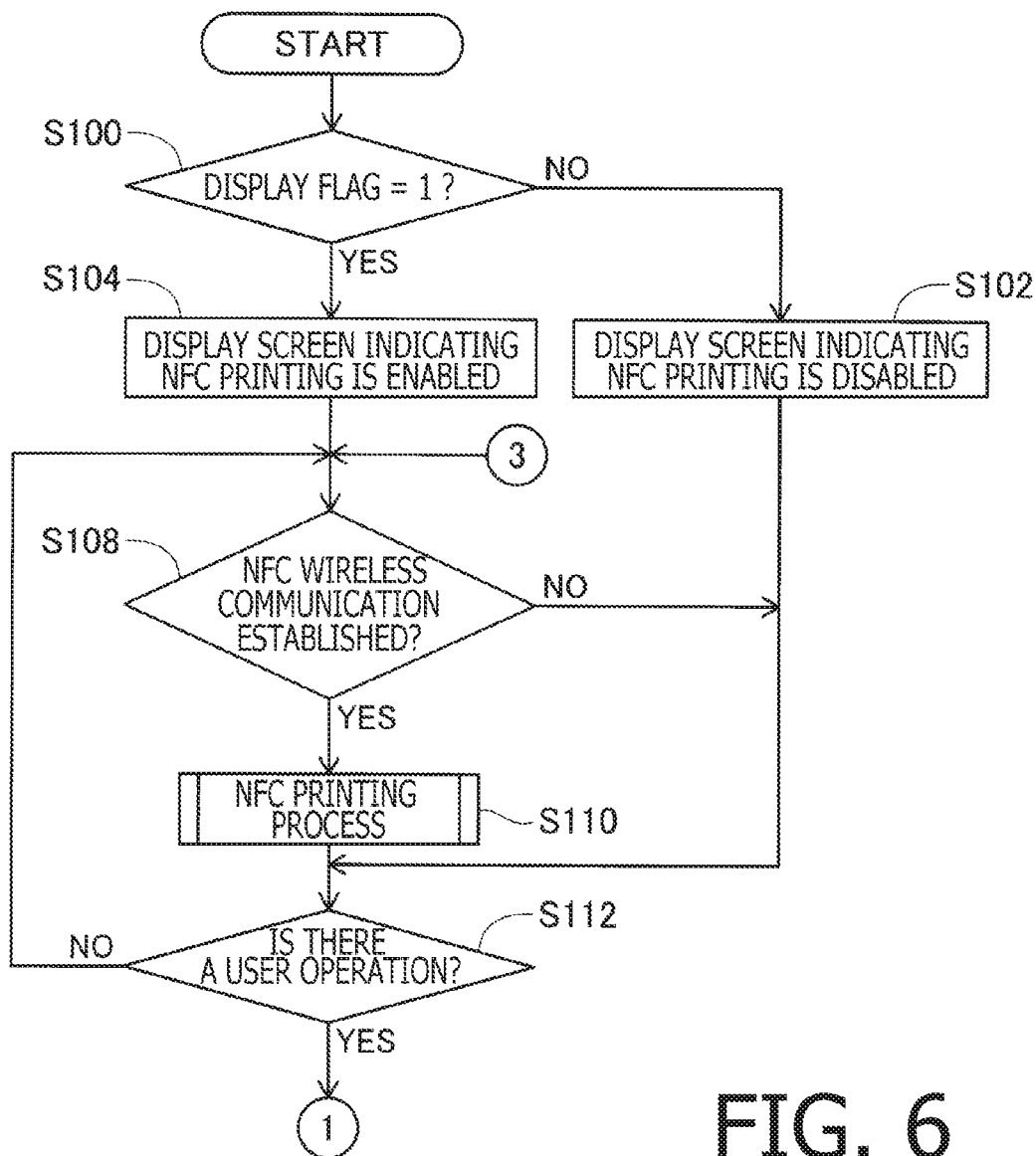
FIGS. 6, 7, 8 and 9 show a flowchart illustrating an operation of the MFP according to the first embodiment of the invention.
Figure 7:
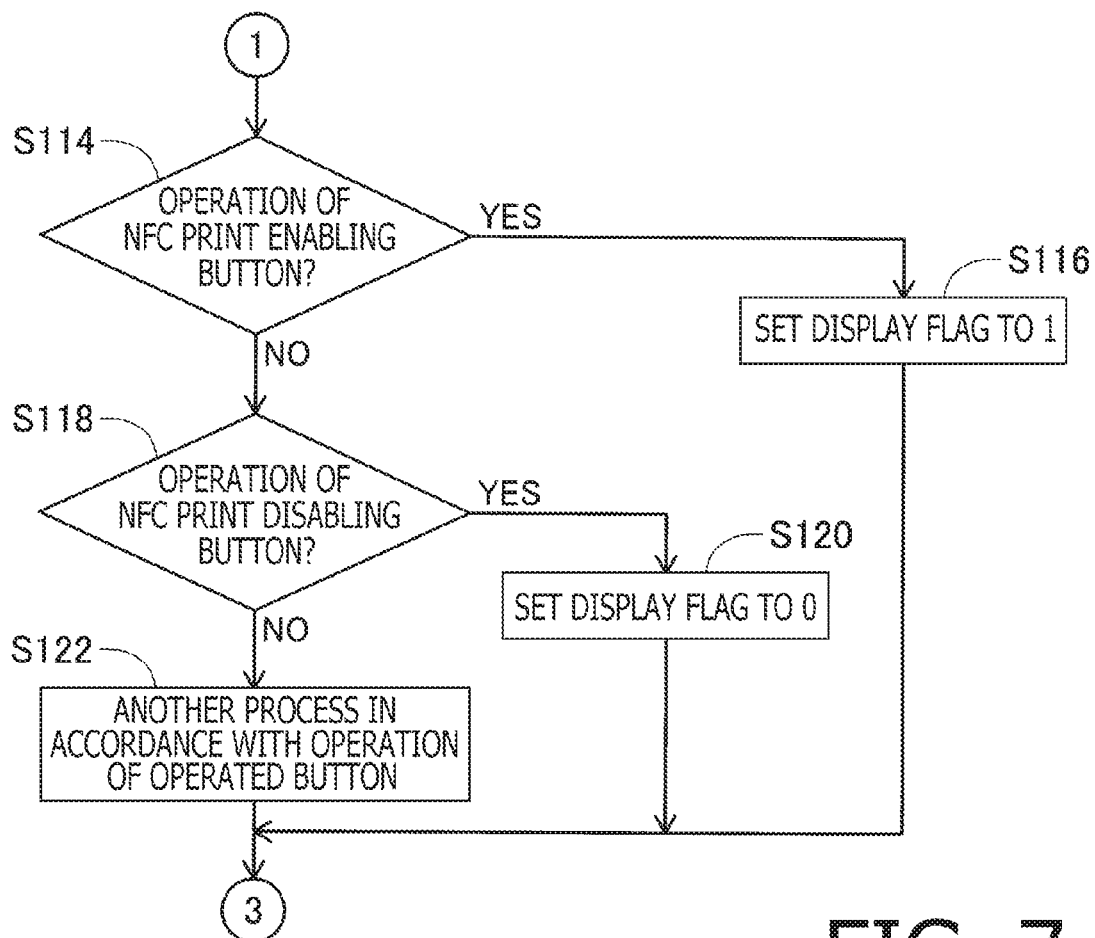
Figure 8:
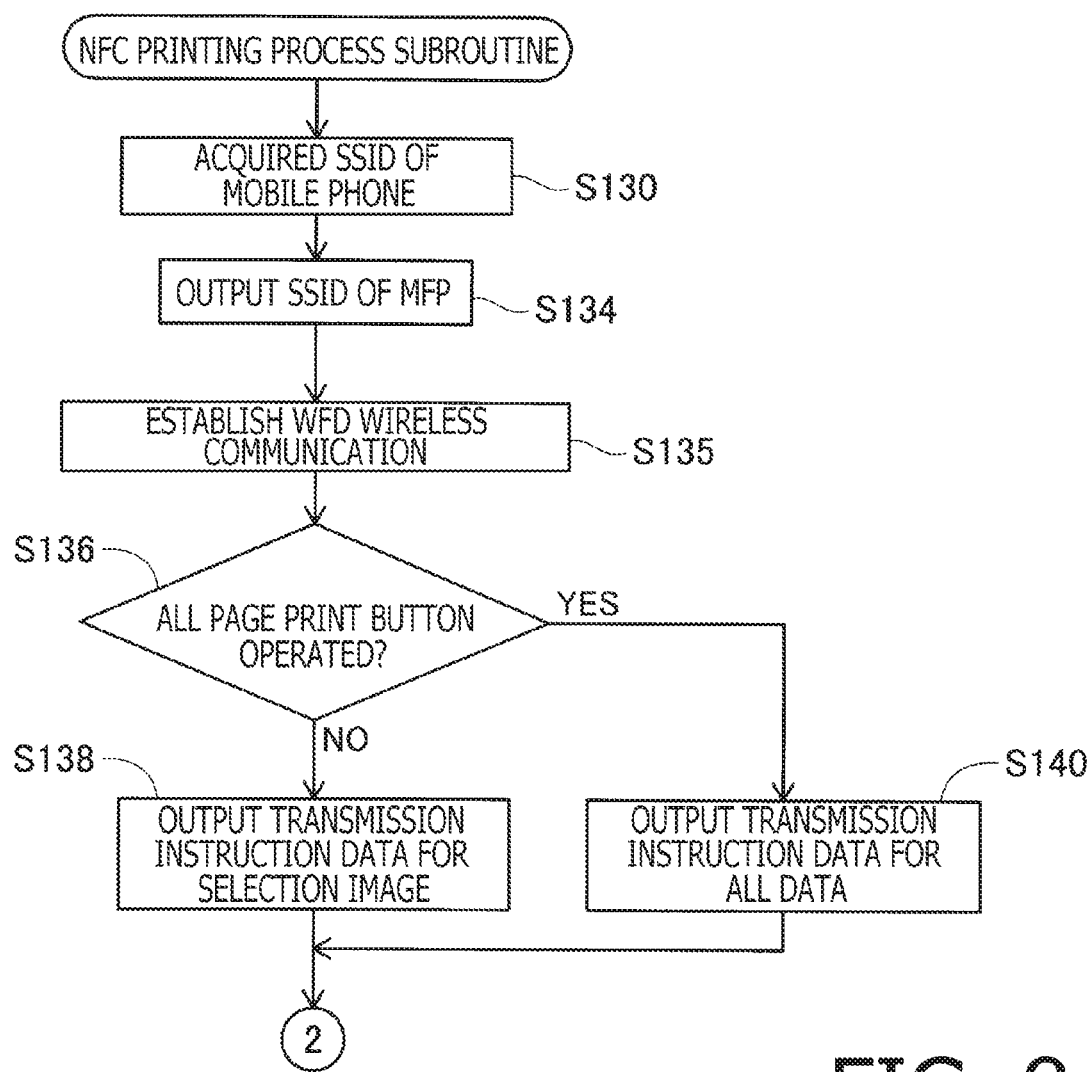
Figure 9:
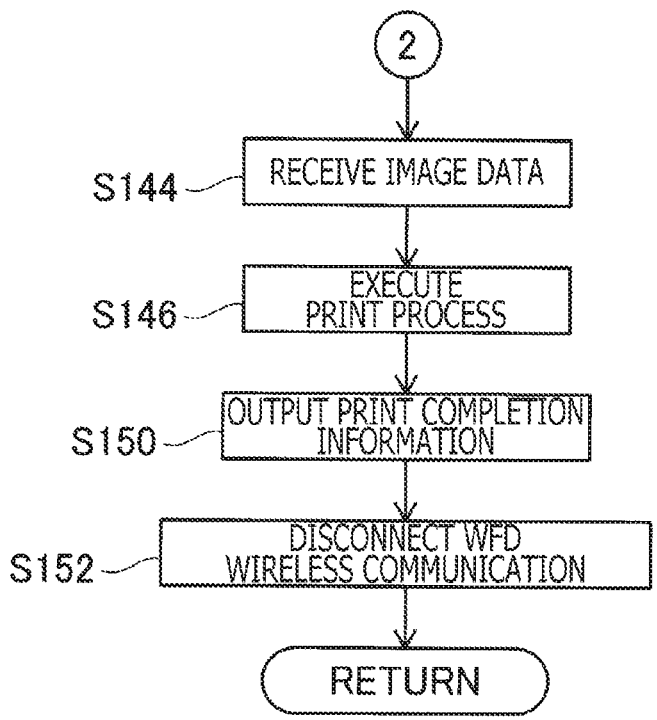

Hereinafter, with reference to FIGS. 6, 7 and 8, a process of printing the image based on the contents data stored in the mobile phone 10 with the MFP 50 will be described.

Firstly, referring to FIGS. 6-9, the print process program 74a, which is executed by the CPU 52 of the MFP 50, will be descried. When the MFP 50 is powered ON and the print process program 74a is invoked, a main flow as shown in the flowchart is started. In S100, the CPU 52 obtains a value of a display flag stored in the storage unit 54, and judges whether the obtained flag value is one or not. The display flag indicates which of the NFC print enabled screen and the NFC print disabled screen is displayed on the panel 56. When the display flag value is zero, the NFC print disabled screen is displayed on the panel 56, while, when the display flag value is one, the NFC print enabled screen is displayed on the panel 56.

If the value of the display flag is not one (S100: NO), the CPU 52 proceeds to S102. In S102, the CPU 52 outputs image data used to display the NFC print disabled screen on the panel 56 via the OS 74b. Then, the CPU 52 proceeds to S112.

If the value of the display flag is one (S100: YES), the CPU 52 proceeds to S104. In S104, the CPU 52 outputs, via the OS 74b, the image data used to display the NFC print enabled screen on the panel 56. Then, the CPU 52 proceeds to S108.

In S108, the CPU 52 judges whether the NFC wireless communication 92 has been established. Specifically, the CPU 52 judges whether event information, which is output via the OS 74b when the NFC wireless communication has been established 92, is received. If the NFC wireless communication has not been established (S108: NO), the CPU 52 proceeds to S112. If the NFC wireless communication 92 has been established (S108: YES), the CPU 52 proceeds to S110. In S110, the CPU 52 executes the NFC print process subroutine illustrated in FIGS. 8 and 9.

In the NFC print process subroutine, the CPU 52 obtains the SSID of the mobile phone 10 transmitted therefrom (S130). That is, the CPU 52 obtains, via the OS 74b, data indicating the SSID of the mobile phone 10 which is transmitted by the mobile phone 10 via the NFC wireless communication 92 and is received by the NFC I/F 70. Then, the CPU 52 proceeds to S134.

In S134, the CPU 52 transmits the SSID of the MFP 50 to the mobile phone 10. That is, the CPU 52 outputs, via the OS 74b, the SSID of the MFP 50 such that the NFC I/F 70 transmits the same to the NFC I/F 20 of the mobile phone 10 via the NFC wireless communication 92. Then, the CPU 52 proceeds to S135. In S135, the CPU 52 instructs the wireless LAN I/F 68, via the OS 74b, to establish the WFD wireless communication making use of the SSID. Then, the CPU 52 proceeds to S136.

In S136, the CPU 52 judges whether the all page print button 120 is being operated. Specifically, the CPU 52 judges whether data which is generated in response to the user operation of the all page print button 12 is being obtained via the OS 74b. This judgment may be done such that the CPU 52 transmits inquires, via the OS 74b, asking whether the all page print button 120 is being operated repeatedly at every predetermined sort interval, and judges based on the responses to the inquiries. If the all page print button 120 is not being operated (S136: NO), the CPU 52 proceeds to S138.

In S138, the CPU 52 transmits instruction data requesting the mobile phone 10 to transmit the image data of the images 100 selected on the mobile phone 10 to the MFP 50 via the WFD wireless communication 90 (hereinafter, such instruction data will also be referred to as selected image transmission instruction data) to the mobile phone 10 via the NFC wireless communication 92. That is, the CPU 52 output, via the OS 74b, the selected image transmission instruction data such that the NFC LAN I/F 70 transmits the same to the mobile phone 10 via the NFC wireless communication 92. Then, the CPU 52 proceeds to S144.

When the all page print button 120 is being operated (S136: YES), the CPU 52 proceeds to S140. In S140, the CPU 52 instruction data requesting the mobile phone 10 to transmit all the image data contained in the contents data subject to print to the MFD 50 via the WFD wireless communication 90 (hereinafter, such instruction will be referred to as all image transmission instruction data) to the mobile phone 10 via the NFC wireless communication 92. That is, the CPU 52 outputs the all image transmission instruction data, via the OS 74b such that the NFC I/F 70 transmits the same to the NFC I/F 20 of the mobile phone 10 via the NFC wireless communication 92. Then, the CPU 52 proceeds to S144.

In S144, the CPU 52 obtains the image data from the mobile phone 10. That is, the CPU 52 obtains, via the OS 74b, the image data which is transmitted from the mobile phone 10, via the WFD wireless communication 90, and received by the wireless LAN I/F 68.

In S146, the CPU 52 executes the print process based on the obtained image data. That is, the CPU 52 outputs data for causing the printing device 60 to execute printing of the images based on the obtained image data via the OS 74b. Then, the CPU 52 proceeds to S150.

In S150, the CPU 52 transmits information indicating that the print process is completed, via the WFD wireless communication 90, to the mobile phone 10. That is, the CPU 52 outputs information indicating the print process is completed such that the wireless LAN I/F 68 transmits the same to the wireless LAN I/F 18 of the mobile phone 10 via the WFD wireless communication 90. Then, the CPU 52 proceeds to S152. In S152, the CUP 52 instructs the wireless LAN I/F 68, via the OS 74b, to disconnect the WFD wireless communication 90. Then, the CPU 52 terminates the NFC print process subroutine.

When the NFC print process subroutine is finished, the CPU 52 proceeds to S112 of the main routine. In S112, the CPU 52 judges whether one of a plurality of operation buttons provided to the MFP 50 is operated. That is, the CPU 52 judges whether data which is generated in response to a user operation of respective buttons provided to the MFP 50 is obtained or not. If none of the operation buttons provided to the MPF 50 is operated (S112: NO), the CPU 52 returns to S108.

If one of the plurality of buttons provided to the MFP 50 has been operated (S112: YES), the CPU 52 proceeds to S114. In S114, the CPU 52 judges whether the NFC print enabling button 110 has been operated. That is, the CPU 52 judges whether data, which is generated in response to a user operation of the NFC print enabling button 110, has been received via the OS 74b.

If the NFC print enabling button 110 has been operated (S114: YES), the CPU 52 proceeds to S116. In S116, the CPU 52 sets the value of the display flag to one. Specifically, the CPU 52 stores a value "1" as the value of the display flag in the storage unit 54. Then, the CPU 52 returns to S108.

If the NFC print enabling button 110 has not been operated (S114: NO), the CPU 52 proceeds to S118. In S118, the CPU 52 judges whether the NFC print disabling button 112 has been operated. That is, the CPU 52 judges whether data, which is generated in response to a user operation of the NFC disabling button 112, has been received via the OS 74b.

If the NFC print disabling button 112 has been operated (S118: YES), the CPU 52 proceeds to S120. In S120, the CPU 52 sets the value of the display flag to zero. Specifically, the CPU 52 stores a value "0" as the value of the display flag in the storage unit 54. Then, the CPU 52 returns to S108.

When the NFC print disabling button 112 has not been operated (S118: NO), the CPU 52 proceeds to S122. In S122, the CPU 52 operates in accordance with a button operation. That is, the CPU 52 outputs data causing the MFP 50 to operate in accordance with the operated button, via the OS 74b. Then, the CPU 52 returns to S108.

Figure 10:
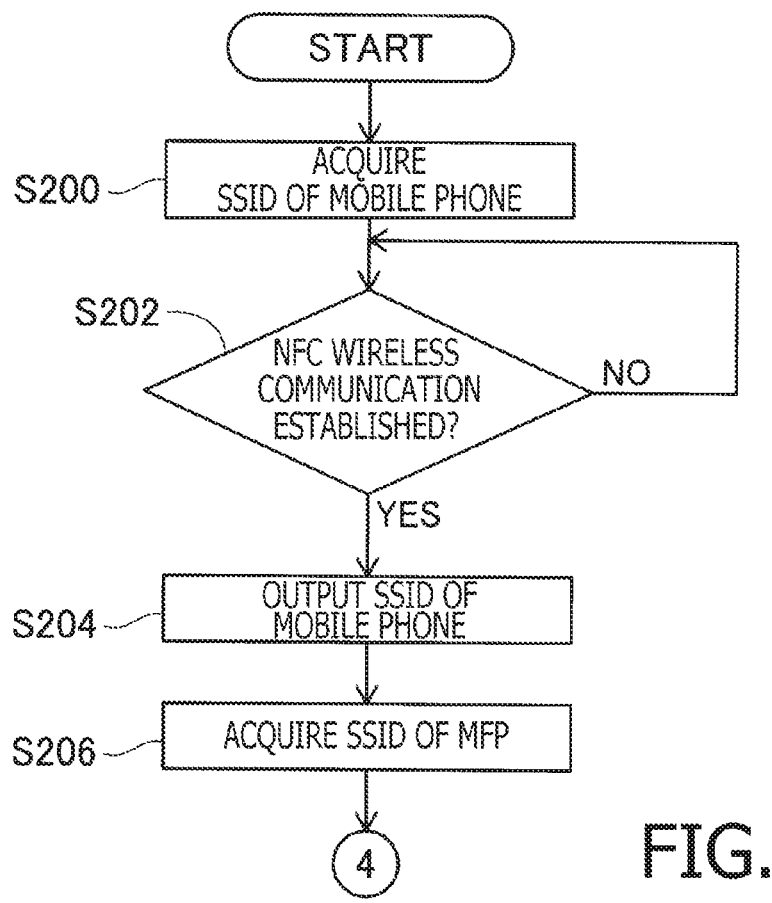
FIGS. 10 and 11 show a flowchart illustrating an operation of the mobile phone according to the first embodiment of the invention.
Figure 11:
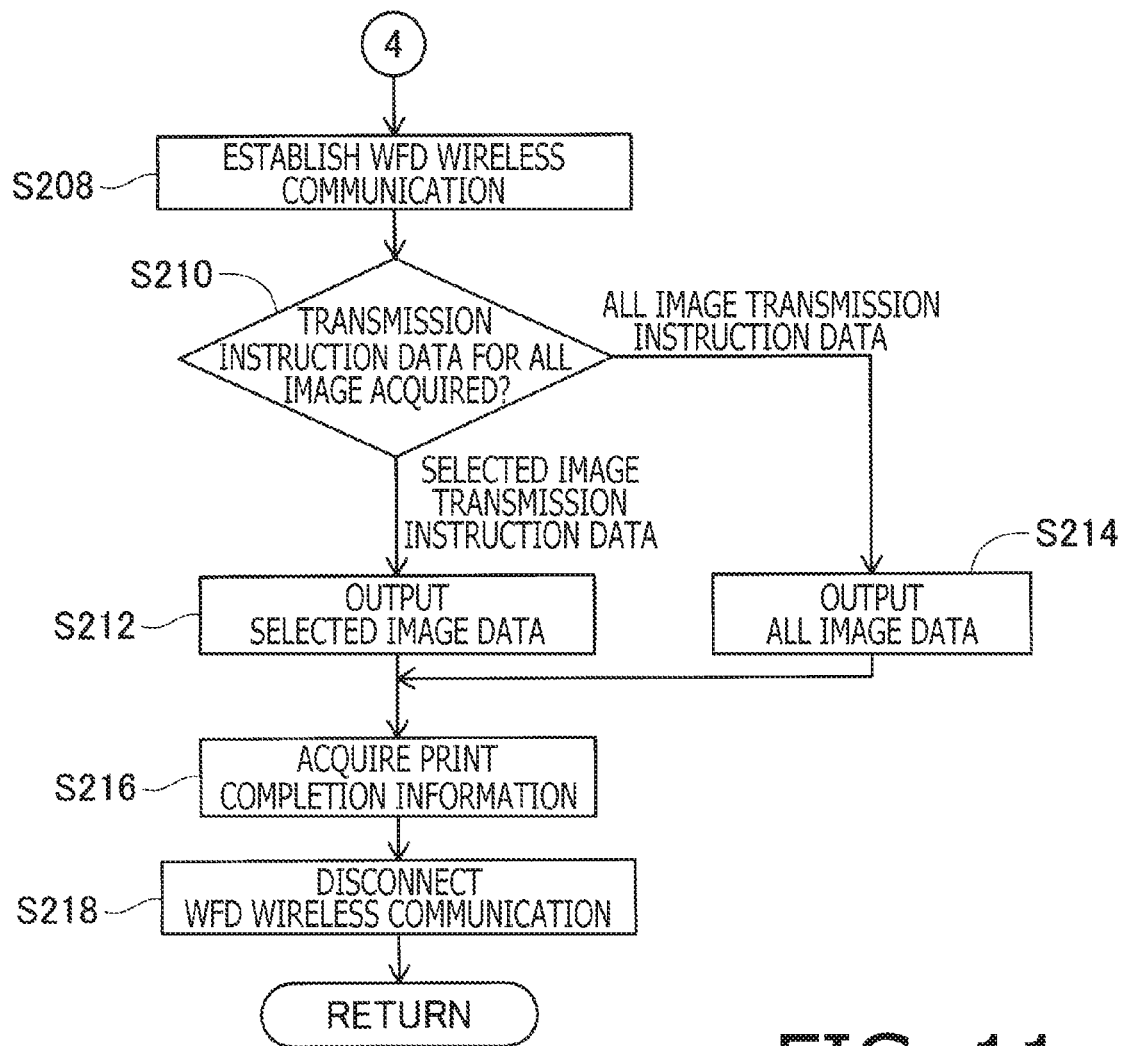

Next, with reference to FIGS. 10 and 11, the print application 32a which is executed by the CPU 12 of the mobile phone 10 will be described. When the mobile phone 10 is turned ON, and the print application 32*a* is invoked, a main process shown in FIGS. 10 and 11 is started. In S200 of the main process, the CPU 11 obtains the SSID which has been set such that the wireless LAN I/F 18 uses the SSID for the WFD wireless communication 90 from the storage unit 14. Then, the CPU 12 proceeds to S202. In S202, the CPU 12 judges whether the NFC wireless communication 92 has been established in accordance with a method similar to one used in S108. If the NFC wireless communication 92 has not been established (S202: NO), step S202 is repeated.

If the NFC wireless communication 92 has been established (S202: YES), the CPU 12 proceeds to S204. In S204, the CPU 12 outputs the obtained SSID such that the NFC I/F 20 transmits the same, via the NFC wireless communication 92, to the NFC I/F 70 of the MFP 50. Then, the CPU 12 proceeds to S206.

In S206, the CPU 12 obtains the SSID of the MFP 50. That is, the CPU 12 obtains data which is generated when the MFP 50 has received the SSID, via the OS 32*b*. Then, the CPU 12 proceeds to S208. In S208, the CPU 12 attempts to establish the WFD wireless communication in accordance with a method similar to one in S134.

In S210, the CPU 12 judges which of the image transmission instruction data is received. That is, the CPU 12 receives one of the all image transmission instruction data and the selected image transmission instruction data, transmitted by the MFP 50, via the WFD wireless communication 92 and received by the NFC I/F 20, is received via the OS 32*b*, and obtained the image transmission instruction data. If the selected image transmission instruction data has been received (S210: the selected image transmission instruction data), the CPU 12 proceeds to S212.

In S212, the CPU 12 transmits the image data of the images 100 selected on the mobile phone 10 to the MFP 50 via the WFD wireless communication 90. That is, the CPU 12 outputs the image data of the images 100 selected on the mobile phone 10 via the OS 32*b* such that the wireless LAN I/F 18 transmits the same to the wireless LAN I/F 68 of the MFP 50 via the WFD wireless communication 90.

If the all image transmission instruction data has been received (S210: all image transmission instruction data), the CPU 12 proceeds to S214. In S214, the CPU 12 transmits all the image data included in the contents data subject to print to the MFP 50 via the WFD wireless communication 90. That is, the CPU 12 outputs all the image data included in the contents data subject to print via the OS 32*b* such that the wireless LAN I/F 18 transmits the same, via the WFD wireless communication 90, to the wireless LAN I/F 68 of the MFP 50. Then, the CPU 12 proceeds to S216.

In S216, the CPU 12 obtains information indicating that the print process is completed. That is, the CPU 12 obtains data which is generated when information indicating completion of the print process via the OS 43*b*. In S218, the CPU 12 causes the wireless LAN I/F 18 to disconnect the WFD wireless communication 90, and terminates the print application 32*a*.

Second Embodiment

Hereinafter, the communication system 1 according to a second embodiment will be described. The configuration of the second embodiment is substantially the same as that of the first embodiment except for the NFC print enabled screen displayed on the panel 56 of the MFP 50. Therefore, in the following description, the NFC print enabled screen displayed on the panel 56 will be described for brevity.

Figure 12:
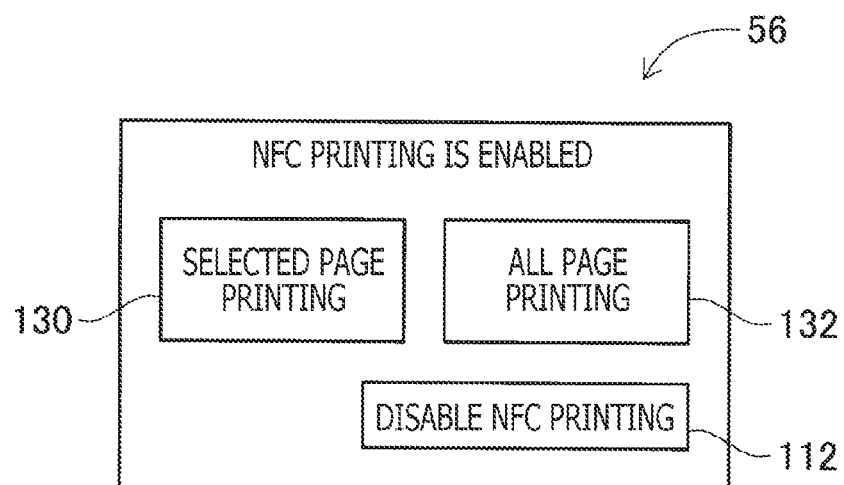
FIG. 12 shows an example showing a state where an image is displayed on a panel of a MFP (multi-function peripheral) according to a second embodiment of the invention.
Figure 13:
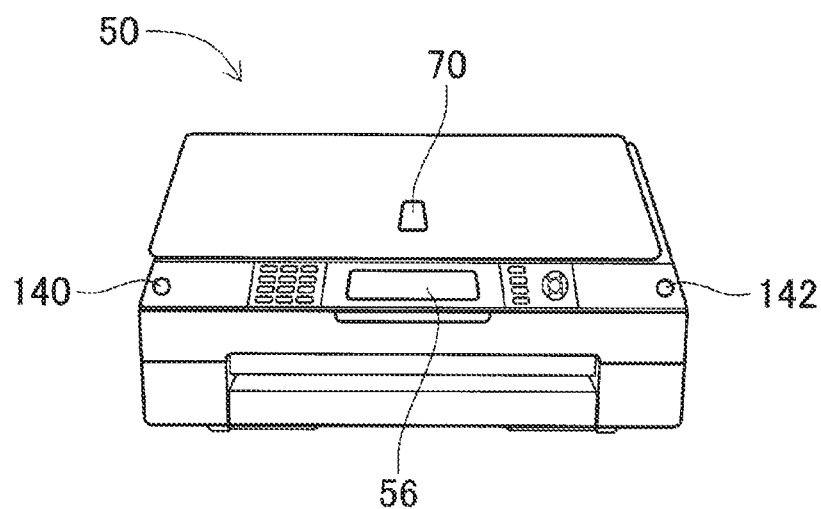
FIG. 13 is a perspective view of an MFP according to a third embodiment of the invention.

When the NFC print enabled screen is displayed on the panel 56 of the MFP 50, as shown in FIG. 12, the select page print button 130 and all page print button 132 are displayed as well. The all page print button 132 is similar to the all page print button 120 described in the first embodiment. That is, the all page print button 132 is for executing a print process to print all the images included in the contents data subject to print. The selected page print button 130 is a button to print images selected on the mobile phone 10 that is the button for executing the selected image print process.

The communication system 1 according to the second embodiment, by bringing the mobile phone 10 close to the NFC I/F 70 of the MFP 50 with operating one of the select page print button 130 and the all page print button 132, one of the selected image print process and the all page print process is executed. Specifically, when the user brings the mobile phone 10 close to the NFC I/F 70 of the MFP 50 with operating the select page print button 130, the NF wireless communication 92 is established and the SSID of the mobile phone 10 is transmitted to the MFP 50 via the NFC wireless communication 92.

If the SSID of the mobile phone 10 is compatible to the MFP 50, instruction data instructing the mobile phone 10 to transmit the image data of the selected images to the MFP 50 via the NFC wireless communication 90 from the MPF 50 to the mobile phone 10. In response to receipt of the instruction data, the mobile phone 10 transmits the image data selected on the mobile phone 10 to the MFP 50 via the WFD wireless communication 92. The MFP 50 executes the print process based on the received image data. That is, the MFP 10 executes the print process to print the images selected on the mobile phone 10.

When the user brings the mobile phone 10 close to the NFC I/F 70 of the MFP 60 with operating the all page print button 132, the print process similar to that, in the first embodiment, when mobile phone 10 is brought closer to the NFC I/F 70 of the MFP 50 with the all page print button 120 being operated. Therefore, description of such a process will not be repeated for brevity.

<Modification>

According to the exemplary embodiments, the all page print button 120 or 132, and select page print button 130 are displayed on the panel 56 of the MFP 50 so that the user select one of select image printing and all page printing. The configuration may be modified such that the buttons are displayed at positions outside the panel 56. For example, at both end portions of the upper surface of the MFP 50, the select page print button 140 and the all page print button 142 may be provided. In such an arrangement, the select page print button 140 and/or the all page print button 142 may be touch sensor type operation buttons or mechanical buttons.

A mobile terminal that transmits the display instruction data to the MFP 50 in accordance with instructions issued by the MFP 50 could be a tablet terminal, a smart phone, and the like, and the mobile terminal needs not be limited to the mobile phone 10.

A device which can selectively execute the all page printing and the select page printing based on the user operation of the buttons need not be limited to the MFP 50, and other printable devices may be used instead.

Techniques employed in the embodiments may be applied not only to selection of the all page printing and the select page printing, but to selection of printing in accordance with a predetermined print setting and printing in accordance with a print setting different from the predetermined setting. Specifically, the aspects of the invention can be applied to selection of color printing and monochromatic printing, or a simplex printing and a duplex printing.

According to the exemplary embodiments, as a close-range communication, the NFC wireless communication is employed. It is noted that TransferJet (registered trademark) wireless communication may be employed instead of the NFC wireless communication. In such a case, as a wireless communication to be established with the handover process could be one of various types of wireless communications. Further, the wireless communication to be established with the handover process could be one of various methods having a longer communicatable range than the TransferJet wireless communication.

In the exemplary embodiments, the CPU 12 of the mobile phone 10 and the CPU 52 of the MFP 50 execute the print application 32*a* and the print process program 74*a* and execute various operations, respectively. However, the invention need not be limited to such a configuration. For example, the CPU 12, which executes the print application 32*a*, may transmit various instructions to the OS 32*b* and other system/hardware configurations. Further, the CPU 52, which executes the print process program 74*a*, may transmit various instructions to the OS 74*b* and other system/hardware configurations.

In the exemplary embodiments, as the CPU 52 executes the print process program 74*a*, the process shown in FIGS. 6-9 is executed. In this process shown in FIGS. 6-9, steps S100-S104, S112-S122, S130-S134, S144-S152 may be omitted. In such a modification, when the NFC wireless communication 92 has been established (S108: YES), the CPU 52 proceeds to S136, while when the NFC wireless communication method has not been established (S108: NO), steps S136-S140 are skipped. It is noted that the modification may include a case where one or some of the steps of steps S100-S104, S112-S122, S130-S134, S144-S152 are omitted/remained.

In the exemplary embodiment, as the CPU 12 executes the print application 32*a*, the process shown in FIGS. 10 and 11 is executed. In this process shown in FIG. 8, steps S200-S208, S216, S218 may be omitted. It is noted that the modification may include a case where one or some of the steps of steps S200-S208, S216, S218 are omitted/remained.

Technical configurations described and shown in drawings may achieve technical effectiveness solely or by various combinations thereof, and should not be limited to configurations set forth in the claims as originally filed. Further, the techniques disclosed or suggested in the specification and drawings may achieve a plurality of objects, while achieving even one of such objects may have technical effectiveness.

Each program exemplified in the aforementioned embodiment may include only a single program module, or may include a plurality of program modules. Each configuration exemplified in the aforementioned embodiment may be a replaceable different configuration. Aspects of the present invention may be achieved by, as well as the CPU 12 or 52 executing the print application 32*a* or the print process program 74*a*, various configurations such as a computer executing a program (e.g., an operating system, an application, or a program) other than the print application 32*a* or the print process program 74*a*, a hardware element (e.g., the panel 22 or 56) operating in accordance with instructions from a computer, a configuration of a computer and a hardware element that operate in collaboration with each other, a computer executing a plurality of programs in collaboration with each other, and a hardware configuration that operates in accordance with instructions from a computer executing a plurality of programs in collaboration with each other.

The invention claimed is:

1. An image processing device, comprising:
an image processing device side wireless communication interface configured to execute wireless communication with a mobile terminal and generate establishment data when the wireless communication with the mobile terminal is established;
an operation acquisition user interface configured to acquire user operation thereof; and
a processor, wherein the processor is configured to:
acquire operation data which is generated as the operation acquisition user interface acquires a user operation when the image processing device side wireless communication interface has not established the wireless communication with the mobile terminal;
acquire establishment data which is generated as the image processing device side wireless communication interface establishes wireless communication with the mobile terminal after the operation data is acquired; and
in response to acquiring the establishment data, determine whether to execute image processing in a first condition or in a second condition, based on the operation data which was acquired by the operation acquisition user interface of the image processing device when the image processing device side wireless communication interface had not established the wireless communication with the mobile terminal and prior to the establishment data being acquired.

2. The image processing device according to claim 1, wherein the processor is further configured to acquire one of first image processing data and second image processing data from the mobile terminal in accordance with the determined one of the first condition and the second condition to be executed, and execute image processing using the acquired one of the first image processing data and the second image processing data.

3. The image processing device according to claim 1,
wherein the image processing executed by the image processing device includes printing processing for printing an image, and
wherein the processor is further configured to:
in response to acquiring the establishment data, determine whether to execute printing in the first condition or in the second condition, based on the operation data which was acquired by the operation acquisition user interface of the image processing device;
when it is determined to execute the printing processing in the first condition, control the image processing device side wireless communication interface to transmit, via the wireless communication, first request data requesting the mobile terminal to transmit first print data necessary for printing an image in accordance with the first condition; and
when it is determined to execute the printing processing in the second condition, control the image processing device side wireless communication interface to transmit, via the wireless communication, second request data requesting the mobile terminal to transmit second print data necessary for printing an image in accordance with the second condition.

4. The image processing device according to claim 3,
wherein the image processing device side wireless communication interface further includes a long distance wireless communication interface configured to execute a long distance wireless communication longer than a near field communication distance, and
wherein each of the first request data and the second request data requests the mobile terminal to transmit print data necessary for printing an image via the long distance wireless communication.

5. The image processing device according to claim 1, wherein the wireless communication is near field communication.

6. The image processing device according to claim 3, wherein one of the first condition and the second condition includes a condition to print an image based on part of image data included in an image data set that includes a plurality of pieces of image data, and the other of the first condition and the second condition includes a condition to print images based on all the image data included in the image data set.

7. A non-transitory computer readable recording medium storing instructions to be executed by a processor of an image processing device comprising an image processing device side wireless communication interface configured to execute wireless communication with a mobile terminal and generate establishment data when the wireless communication with the mobile terminal is established, and an operation acquisition user interface configured to acquire user operation thereof, the instructions when executed causing the processor to:
  acquire operation data which is generated as the operation acquisition user interface acquires a user operation when the image processing device side wireless communication interface has not established the wireless communication with the mobile terminal;
  acquire establishment data which is generated as the image processing device side wireless communication interface establishes wireless communication with the mobile terminal after the operation data is acquired; and
  in response to acquiring the establishment data, determine whether to execute image processing in a first condition or in a second condition, based on the operation data which was acquired by the operation acquisition user interface of the image processing device when the image processing device side wireless communication interface had not established the wireless communication with the mobile terminal and prior to the establishment data being acquired.

8. The non-transitory computer readable recording medium according to claim 7, wherein the instructions when executed further cause the processor to acquire one of first image processing data and second image processing data from the mobile terminal in accordance with the determined one of the first condition and the second condition to be executed, and execute image processing using the acquired one of the first image processing data and the second image processing data.

9. The non-transitory computer readable recording medium according to claim 7,
wherein the image processing executed by the image processing device includes printing processing for printing an image, and
wherein the instructions when executed further cause the processor to:
  in response to acquiring the establishment data, determine whether to execute printing in the first condition or in the second condition, based on the operation data which was acquired by the operation acquisition user interface of the image processing device;
  when it is determined to execute the printing processing in the first condition, control the image processing device side wireless communication interface to transmit, via the wireless communication, first request data requesting the mobile terminal to transmit first print data necessary for printing an image in accordance with the first condition; and
  when it is determined to execute the printing processing in the second condition, control the image processing device side wireless communication interface to transmit, via the wireless communication, second request data requesting the mobile terminal to transmit second print data necessary for printing an image in accordance with the second condition.

10. The non-transitory computer readable recording medium according to claim 9,
wherein the image processing device side wireless communication interface further includes a long distance wireless communication interface configured to execute a long distance wireless communication longer than a near field communication distance, and
wherein each of the first request data and the second request data requests the mobile terminal to transmit print data necessary for printing an image via the long distance wireless communication.

11. The non-transitory computer readable recording medium according to claim 7, wherein the wireless communication is near field communication.

12. The non-transitory computer readable recording medium according to claim 9, wherein one of the first condition and the second condition includes a condition to print an image based on part of image data included in an image data set that includes a plurality of pieces of image data, and the other of the first condition and the second condition includes a condition to print images based on all the image data included in the image data set.

* * * * *